United States Patent [19]

Hall

[11] Patent Number: 4,638,586

[45] Date of Patent: Jan. 27, 1987

[54] FISHING LURE

[76] Inventor: Joseph P. Hall, P.O. Box 505, Branson, Mo. 65616

[21] Appl. No.: 872,169

[22] Filed: Jun. 9, 1986

[51] Int. Cl.⁴ ............................................. A01K 85/00
[52] U.S. Cl. .................................. 43/42.13; 43/42.28; 43/42.26
[58] Field of Search ................. 43/42.13, 42.26, 42.28, 43/42.27, 42.53, 42.29

[56] References Cited

U.S. PATENT DOCUMENTS

| | | | |
|---|---|---|---|
| 3,110,979 | 11/1963 | Woodley | 43/42.13 |
| 3,143,824 | 8/1964 | Thomas | 43/42.26 |
| 3,497,987 | 3/1970 | Perrin | 43/42.28 |
| 3,590,514 | 7/1971 | Begley | 43/42.28 |
| 3,808,726 | 5/1974 | Flanagan | 43/42.13 |
| 3,996,688 | 12/1976 | Hardwicke | 43/42.28 |
| 4,074,454 | 2/1978 | Cordell | 43/42.28 |
| 4,133,135 | 1/1979 | Miles | 43/42.13 |
| 4,215,506 | 8/1980 | LeBoeuf | 43/42.28 |
| 4,329,804 | 5/1982 | Brown | 43/42.28 |
| 4,468,881 | 9/1984 | Gordon | 43/42.28 |
| 4,571,877 | 2/1986 | Montgomery | 43/42.13 |

Primary Examiner—Nicholas P. Godici
Assistant Examiner—Kurt Rowan
Attorney, Agent, or Firm—Thomas M. Scofield

[57] ABSTRACT

Improvements in the lure elements of fishing lures including spinner baits and jig baits; a lure sheathing for the weights commonly employed with fishing lures (including spinner baits and jig baits) which sheathing covers a substantial portion of the leading part of the weight and additionally supplies a circumferential fringe of forwardly, outwardly and rearwardly streaming elements, legs or streamers, such further acting as lure elements; improvements in means for mounting, securing and positioning multiple streamer elements to actively surround, enclose and hide a fish hook in fishing lures of all types including a weight therewith, such as spinner baits and jig baits.

39 Claims, 10 Drawing Figures

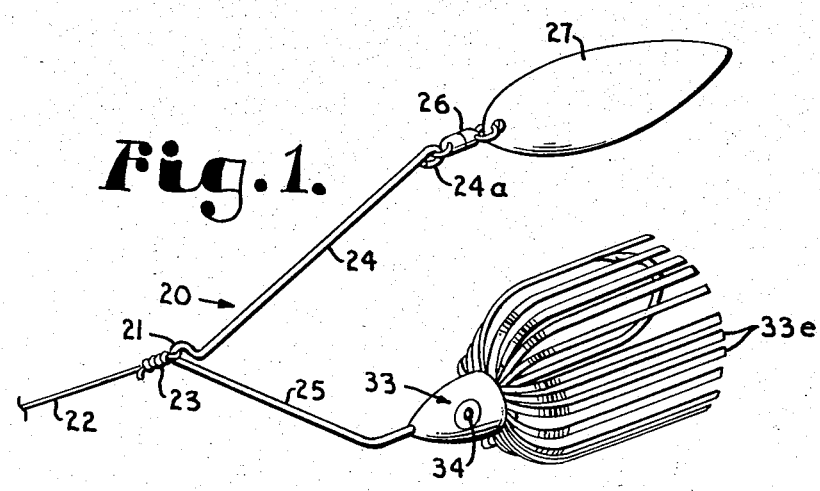
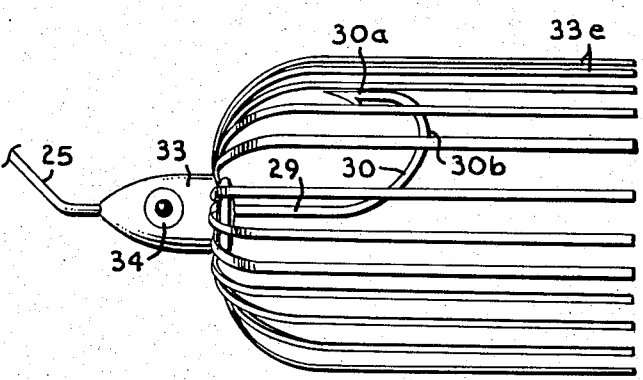
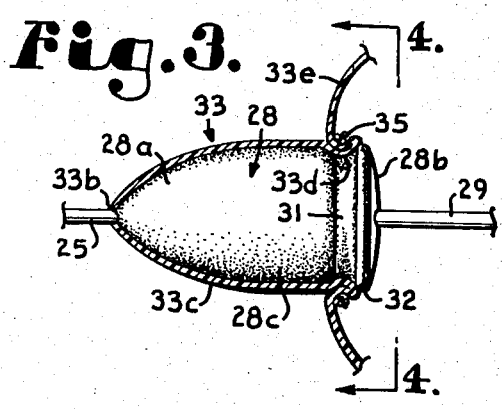
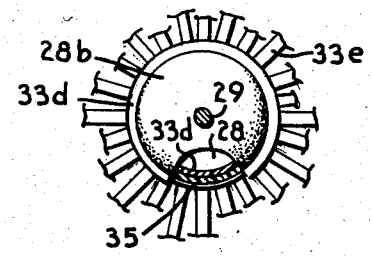
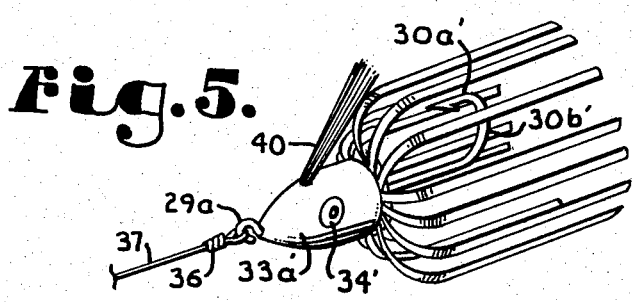

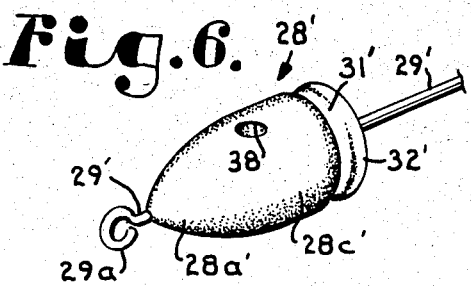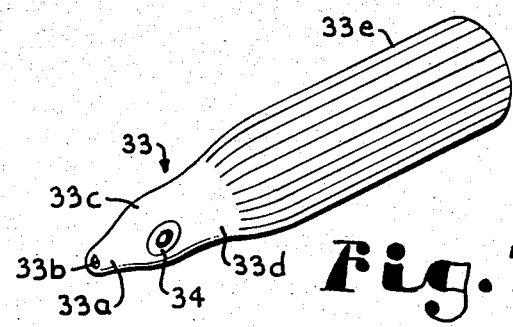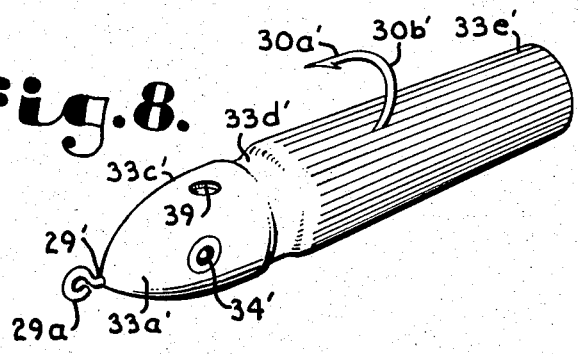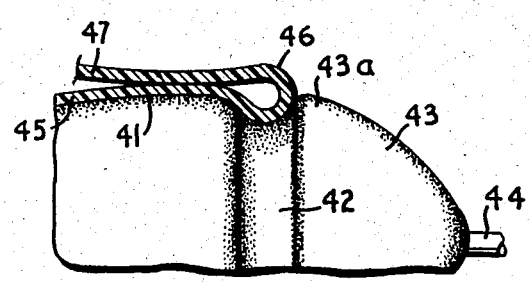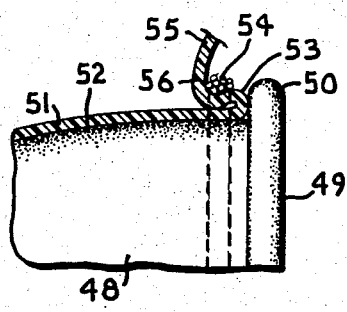

FISHING LURE

BACKGROUND OF THE INVENTION

A vast quantity of technology, thought and effort has gone, historically, into the pursuit of fish. The basic element of the technology involves a hook. There is a line attached to the hook. There is, typically, a weight attached to the line. An actual bait may be employed with the hook or other lure elements associated with the hook both to disguise the hook itself and approximate the appearance of some food source or the like for the fish. Spinners may be attached to certain lures to draw the attention of the fish. Combinations of such elements and types of lures for use in the various fishing modes and techniques and pursuit of the various types of fishes abound.

It has long been known that the hook is often best attached to the weight. Yet further, it has long been known that the weight should carry some type of trailing elements to both screen the actual presence of the hook and provide an attractive appearance to the fish. Still further, the desirability of using a multiplicity of flexible streamers surrounding or adjacent to the working parts of the hook are known to the art.

The subject invention provides a novel method and structure for not only effectively screening the hook and weight from the view of the fish (in an attractive manner), but also such for providing, mounting and maintaining a gaggle or cluster of streamers that work and stream in a pattern and motion action that is most attractive to the fish. The subject bait best approximates all of the optimum elements of a lure for the purpose of effective fishing.

BRIEF DESCRIPTION OF THE INVENTION

Broadly speaking, the invention comprises a plastic sleeve having streamers or legs extending from one end thereof, such mounted in a particular manner on the leading portion of a weight shaped like a bullethead or slug (or the equivalent) and cast or mounted on a fish hook wire. The sleeve, including the streamer or multiple leg portion thereof, is so mounted and held with respect to the fish lure weight that a reversed spider head/legs or small octopus-like appearing assembly is formed. This device, when moved in the water or through the water in the prescribed actions employed with the various lures remarkably emulates the appearance and movement of a spider or spider like creature, while, all the time, remarkably and effectively screening the hook from the fish within the legs or streamers. Thus, all of the legs or streamers, once the sleeve is properly and correctly secured with respect to the weight, extend first forwardly then outwardly and, lastly, rearwardly in such a manner as to produce the described action and also obscure the hook. The leg elements, by virtue of special mounting, are so spaced apart from one another as not to interfere with each other in performance of the desired action in utilization of each particular type of lure in the fishing operation.

Basically, in the preferred form, the subject invention is directed to:

(1) The leading sleeve portion of sufficient length to substantially cover the major body portion of the weight, thus to provide an attractive body portion to the fish;

(2) A groove preferably provided at or close to the rear end or past the middle of the weight;

(3) Optimally a flange also provided for extra rear securement of the forward secured sleeve, such following the groove;

(4) A tie or the equivalent thereof securing a doubled over and led back sleeve portion optionally located just before or at the streamer/leg portion of the sleeve within the groove and (5) The streamers/legs individually extending first forwardly, then outwardly and arcuately away from the body of the weight overlying or covering the entire portion of the hook extending rearwardly from the weight, while also streaming to the rear with spacing apart thereof for optimal motion and activity of each one thereof.

In short, the improvement of the subject invention is not the old original concept of having streamers simply trailing rearwardly from a sleeve on the rear portion of a weight. This improvement further is not the next step in development of these lures where the sleeve is pulled onto the rear of the lure weight with the streamers then trailing rearwardly after making a simple turn. What the subject improvemet involves is the critical further step of mounting the sleeve on the front part of the weight with the streamers first rearwardly trailing toward the hook. At this point, however, an intermediate portion of the sleeve is doubled back forwardly and then secured to the rear or intermediate portion of the weight. Optimally, a groove and/or flange is/are provided for the greatest effectiveness in this securement. With this novel structural improvement, the best results with respect to solving the problems of: (1) obscuring the hook, (2) obtaining optimal, maximal action of the streamers and (3) providing extraordinary simulation of fish attracting organisms are all achieved.

THE PRIOR ART

Applicant is aware of the following patents which are directed to means for screening the hook of a fishing fly, lure or bait, while additionally attempting to provide an attractive appearance to the fish being sought (or fish type being sought).

Hayes 1,336,227, issued 4-06-20 "Artificial Floating Fly and Hook";

Peckinpaugh 1,929,150 "Fish Lure", issued Oct. 3, 1933;

Schavey 2,238,292 "Fish Lure", issued Apr. 15, 1941;

Arbogast 2,268,541 "Artificial Fish Bait", issued Jan. 6, 1942;

Gambill 2,523,949 "Fish Lure", issued Sept. 26, 1950;

Bunker 2,763,954 "Fish Lure", issued Sept. 25, 1956;

Thomas 3,143,824 "Fish Lure", issued Aug. 11, 1964 (first patent known by applicant to provide reverse mounting of streamers surrounding hook);

McClellan 3,848,353 issued Nov. 19, 1974 for "Rattle Sounder For Fishing Lures";

Jones 3,959,060, issued May 25, 1976 "Method of Making Fishing Lure With Decorative Weighting";

Shannon 4,033,065 issued July 5, 1977 for "Fishing Lure" (another reversed mounting of streamers with respect to the hook per Thomas 824 supra);

Parker 4,045,903 issued Sept. 6, 1977 for "Artificial Fishing Lure";

Norman 4,435,914, issued Mar. 13, 1984 for "Fish Lure" (apparently another reverse mounting of "a rubber material skirt assembly");

Opperman et al 4,453,334 issued June 12, 1984 for "Fishing Lure" (apparently another reverse mounting of a streamer skirt).

In the above patents, both the jig type baits and spinner baits are shown. Those noted as having reversed skirts therein are all spinner baits. All of the patents noted at least have a streamer tail, either direct trailing or reverse trailing or some near equivalent thereof. The ones particularly noted with parenthetical comment above are those with respect to which the instant invention makes particular and specific improvement.

OBJECTS OF THE INVENTION

A first object of the subject invention is to provide improvements in fishing lures, including those of spinner bait and jig bait configuration.

Another object of the invention is to provide improvements in the camouflage of fishing lures particularly with respect to the appearance of the weight to which the hook is commonly attached and further in the manner of camouflaging the presence of the hook, as well as in the manner of providing fish attracting elements in the lure both with respect to the weight per se and the area or volume surrounding the hook.

Another object of the invention is to provide novel methods of and apparatus for mounting a multiplicity of streamers on a fishing lure weight, particularly with respect to a hook connected to the weight, the streamers associated with the sleeve operating to cover the trailing portion of the weight and, further so mounted and received on the weight with respect to the hook as to provide unique screening, distraction, appearance, effectiveness and action in the use of the lure in fishing.

Another object of the invention is to provide methods of and apparatus for producing extraordinarily useful, attractive and effective baits and fishing lures including those of the spinner bait and jig bait form.

Another object of the invention is to provide improvements over the above mentioned patents to Norman 914, Thomas 824, Shannon 065 and Opperman et al 334 showing reversed streamers including, additionally, the older type lures utilizing purely trailing streamers or strands.

Still another object of the invention is to provide fishing lures of the character described which are relatively inexpensive to manufacture, are extraordinarily attractive in appearance, which are further extraordinarily attractive in attracting fish and which are sturdy and long lived in use.

Another object of the invention is to provide fishing lures having unique configurations and appearances in the zone of the weight and hook thereof which enable such to simulate, in a most realistic manner, motions of live bait or fish attracting organisms swimming through or moving about in the water.

Another object of the invention is to provide fishing lures of the character described which are remarkably lifelike in appearance, action and motion whereby to be unusually visually attractive to fish.

Still another object of the invention is to provide such a fishing lure of the character described where, in a jig type lure or bait, the highly successful hook obscurement and organic action or motion of the streamers, legs or threads are not impeded by or interfered with by the presence of a weed guard of conventional configuration.

Other and further objects of the invention will appear in the course of the following description thereof.

THE DRAWINGS

In the drawings, which form a part of the instant specification and are to be used and read in conjunction therewith embodiments of the invention are shown and, in the various views, like numerals are employed to indicate like parts.

FIGS. 1-4, inclusive are drawing figures directed to the improved lure construction applied to a spinner type bait.

FIG. 1 is a three-quarter perspective view, from above, of the spinner bait lure in use under water (but with the streamers, strands or legs drawn in a regular, non streaming configuration which does not accurately show the highly individual movement of each streamer, each of which is independent of the motion of the others.)

FIG. 2 is a side view of the weight/hook/sleeve/streamer portion of the spinner bait of FIG. 1. (Again, the individual legs, strands or streamers are shown trailing in geometrically regular fashion behind the leading weight, which would definitely not be the case in actual movement of the lure through the water.)

FIG. 3 is an enlarged view of the external body of the weight of the device of FIGS. 1 and 2 with the sleeve or skin removed from the portion of the body of the weight facing the observer, thus giving a sectional view of the sleeve or skin and showing one manner of positioning and fixing the intermediate portion of the sleeve or skin ahead of the streamers, strands or legs with respect to the preferred weight groove/flange retainer construction.

FIG. 4 is a view taken along the line 4—4 of FIG. 3 in the direction of the arrows. (Additionally, a portion of the rear end of the weight is cut away through the flange at the rear end thereof and, as well, a cut is made through a portion of the rearmost folded over portion of the sleeve or skin in the groove. This enables a view of the tie or securement portion of the sleeve in the groove seen to the right center of FIG. 3.)

FIGS. 5-10, inclusive are directed to a jig bait form of the subject improvement.

FIG. 5 is a three-quarter perspective view from above of the entire jig bait assembly in use in the fishing operation showing the skin/sleeve applied to the weight and the streamers, strands or legs running forwardly, outwardly and backwardly from the base of the weight around and obscuring the hook. Once again, the streamers are shown in geometrically regular position with respect to one another, rather than in the multi-dimensional writhing, wriggling, etc. action and position they would take in fishing action.

FIG. 6 is a three quarter perspective view, from above and the front, of the jig bait weight, per se, before the sleeve or skin is applied thereto. Aside from the front loop on the hook wire, this weight is essentially the same in configuration as that seen in side view in FIG. 3.

FIG. 7 is a three-quarter perspective view from above of the sleeve or skin, per se, before the said sleeve and the integral streamers are initially applied to and over the leading portion of the weight of FIG. 6.

FIG. 8 is a three-quarter perspective view from above of the weight of FIG. 6 with the sleeve of FIG. 7 fitted initially thereover before the intermediate portion of the sleeve is rolled over in the manner seen in FIG. 3 for securement of the sleeve or skin in the (preferred) groove of the weight before the (preferred) flange on the end of the weight.

FIG. 9 shows the portion of the sleeve or skin next to (forward of) the streamers/legs wrapped back upon itself with respect to the (preferred) groove provided intermediate or towards the rear end of the weight just before securing the double thickness of the sleeve/skin into said groove. The rear end of the weight is extended to show the manner of increasing the weight of certain lures.

FIG. 10 is a view differing from that of FIG. 9 in that the sleeve/skin has been secured with respect to the weight, but against a flange alone without a (preferred) groove present, thus compare FIG. 3.

Referring to the drawings and first to FIGS. 1-4, inclusive, at 20 is generally indicated an elongate wire which is so configured as to provide a connection juncture 21 for a line connection 22 and connector 23, the wire having spinner leg 24 and weight leg 25. Wire 24 may end in loop 24a to which connector member 26 may connect, in rotatable fashion, spinner 27.

Referring to FIG. 3, weight 28, typically cast of lead, receives, into the forward end 28a thereof, wire 25. Extending into the other end thereof is the shank 29 of a hook 30 of typically conventional configuration. The Thomas U.S. Pat. No. 3,143,824 above shows a typical end loop engagement of a spinner bait wire with a hook shank end inside a weight. Hook 30 has barb 30a, bend 30b and shank 29. The distance between the point of the hook and the shank is known as the gap and the zone or area covered by the barb on the shank (therebetween) called the throat. Weight 28 in FIGS. 1-4, inclusive is specially configured adjacent rear end 28b thereof. Specifically, there is provided a groove 31 circumferentially around the cylindrical body portion 28c adjacent the rear end 28b thereof and, further, a flange 32 of at least somewhat greater outer diameter than that of cylindrical portion 28c is provided defining the rear end of groove 31. Alternatively, the flange 32 may be replaced by a cylindrical portion of substantially the same outer diameter as cylindrical portion 28c or such flange may be provided of yet greater outer diameter analogous to the construction seen in FIG. 10 to be described.

The weight 28 is typically of the configuration shown, somewhat like that of a handgun cartridge slug or, in the configuration of FIG. 9, of a structure more approaching a rifle cartridge slug with an elongate tapered rear end. The front end 28a is roughly conical or rounded conical form with there being a substantially cylindrical intermediate portion 28c and a flat or slightly arcuate rear end 28b. Fitted over weight 28 from the forward end 28a thereof is a resilient sleeve generally designated 33 which has (FIG. 7) a forward near conical tip 33a with opening 33b therein, egg shaped head portion 33c typically having eye simulations 34 provided thereon, skirt portion 33d and streamers, strips, tendrils or strands 33e making up the rear portion thereof. This sheath or skin part may be optionally formed on a mandrel by dipping such into a plastic solution with the formed, cured skin, after a multiplicity of dippings, being slit by a plurality of cutters down the lower portion of the length of the "pointed" mandrel.

When the weight 28 is cast on wire 25, with the looped end of wire 25 and the looped end of hook 29 received in the casting, the wire 25 (21, 24, 24a) is not yet formed to the configuration of the spinner assembly seen in FIG. 1. The wire portion 25 and the rest of the length of the same wire is straight, permitting the passage of the sleeve or skin 33, by virture of opening 33b, over wire 25 to reach and be pulled on and over weight 28. The skirt portion 33d is then rolled over upon itself, as it may be seen in FIG. 3 in the zone of groove 31 preferably, but not neccessarily ahead of flange 32 and a securement or tie 35 is made on the doubled over skirt portion 33d. The skin or sleeve 33 is resilient and of smaller size than the size of weight 28. Thus the skin or sleeve 33 is stretched and forms a tight fit on weight 28. Securement 35 completes the application of the skin or sleeve 33 to the weight. An adhesive optionally may be employed internally of the sleeve to aid in attachment of the sleeve or skin 33 to the weight 28. Excessive stretching of the plastic material will make the lure especially vulnerable to splitting if the cover 33 is nicked or scratched.

It should be understood that, as may be seen in FIGS. 1-5, inclusive, the entire skirt portion 33d may be received within the groove or overlap portion so that the streamers, tendrils, legs, etc. may just extend therefrom: first forward, then outwardly, then rearwardly. In this case, a considerable portion of the skirt portion 33b and possibly some body portion 33c may be in the groove and extending over the flange 32. Alternatively, whatever the rearward extension of the tied portion or sleeve adjacent the tie portion, part of the skirt portion 33d may extend forwardly and outwardly from the tie 35 (or securement of any sort) thus to cause an even greater tendency for the streamers or tendrils to splay outwardly before turning over towards the hook. Also, depending upon the weight of the material, the streamers or tendrils may naturally fall into a pattern approximating that seen in FIGS. 1 and 2 when the weight is held vertically in the air or is being pulled through the water in horizontally oriented direction (for a spinning lure). Such alternatively may drape themselves outwardly in a more umbrella shaped arrangement when hanging in air or stream in turbulent waving, wiggling, writhing manner in motion through the water at varying angles of curvature.

Referring to FIGS. 5-8, inclusive, therein is shown the mounting of an identical sleeve or skin on a substantially identical weight in a substantially identical manner. Accordingly parts which are the same as set forth in FIGS. 1-4, inclusive, are numbered the same, but primed. These parts will not be redescribed. Only the different and distinctive features of the structure of FIGS. 5-8, inclusive will be mentioned. The skin configuration of FIG. 7 has already been described and is the same for the lure of FIGS. 5-8, inclusive.

FIG. 6 shows a three-quarter perspective view from above of the weight 28' of the lure in question. This is a jig type lure. The hook shank 29' extends entirely through the weight 28' (weight 28' is cast around the shank 29') with the front end 29a of shank 29' being formed into a loop to receive a connector 36 with line 37 connected thereto. The hook is formed, preferably, with loop 29a and the weight 28' is cast on hook shank 29' before the sleeve or skin 33 is pulled onto the weight. The sleeve opening 33b is thus either somewhat enlarged before application to the weight or is enlarged somewhat by the action of being pulled over loop 29a. The resiliency of the skin or sleeve tends to reclose the opening after passage over the loop. In the case of a jig bait, an angled opening 38 is typically provided in said weight aligned with the barb 38' of the hook. After the sleeve 33 has been pulled over the weight as seen in FIG. 8, an opening 39 is punched through or cut into the sleeve portion 33c'.

The relationship of the weed guard 40 to hook 30a' remains the same as conventional. The tentacles, tendrils, streamers, etc. undulate, work or stream between the weed guard and the hook tip, typically, in use of the lure of FIGS. 5-8, inclusive. The weight 28' is shown as having a flange 32' aft of groove 31' which is of the same outer diameter as cylindrical weight portion 28c'. The same flange variations or options as previously described with respect to the weight 28 of the lure of FIGS. 1-4, inclusive apply. FIG. 8 shows the sleeve and streamers pulled onto weight 28' before the reversal of the streamers and skirt portion 33d'. The same considerations previously given with respect to the sleeve 33 and weight 28 with respect to securement of skirt portion 33d' in groove 31' apply as were related earlier. That is, the securement may leave a portion of the skirt overlying flange 32', more than seen in FIG. 3, for example, or may secure the sleeve in the manner seen in FIG. 3. The securement or tie may be on the bases of the streamers or entirely on the skirt portion 33d'. A portion of the skirt portion 33d' may extend forwardly of the tie or only parts of the streamers.

Referring to FIG. 9, therein is shown a fragmentary portion of a weight 40. The purpose of this figure is to illustrate configuration variations in weights and grooves. In this figure, the option is seen of the weight body portion 41 being arcuate back to groove 42. This omits cylindrical portion 28c, for example. Also, instead of a flange 32 and abrupt end portion 28b, there is provided an extended rear end portion 43. Extending the rear end portion is a common manner or mode of adding additional weight to the weights in certain lures for various purposes. Hook shank 44 extends into or through the weight illustrated, depending on whether the weight is a jig type or a spinner type lure. In this case, skin or sleeve 45 has doubled over rearmost portion 46 in such fashion as to be able to fit into groove 42 before a securement or tie as at 35 in FIG. 3 is employed. Depending on where the streamers 47 begin, it may be desirable to overlap portion 46 over the rearmost portion of groove 42 at 43a to a greater or lesser extent.

Referring to FIG. 10, therein is shown an alternative (not preferred, but workable) to the grooves 31, 42, 31', etc. In this case, the weight 48 has a rear end 49 with enlarged or greater diameter flange or ring 50 positioned thereat. Skin 51 overlays the front end portion 52 of weight 48 and is doubled over at 53 to receive tie or securement 54. Once again, the streamers 55 may start at or under the securement 54 or considerably therepast. In this case, the nonslit portion of the sleeve or skin 51 extends as at 56 well past the securement 54. In all cases the flanges may be interrupted or continuous.

The improvement of the subject application, then, lies in a weight for a fishing lure. Such weight typically comprises a substantially bullet or cartridge slug shaped configuration in at least the leading portion thereof, with a substantially lighter, semi-conical front end portion, a substantially cylindrical body portion and a blunt rear end portion following said body portion. Alternatively, which is also like some rifle cartridge slugs, the entire weight may be conical in front and also near conical or rearwardly tapering in the rear. There is a hook wire typically received at least in part in said weight and fixed with respect to same. Typically, the weight is cast over at least part of the hook lead wire.

The following shank wire of the hook extends substantially axially rearwardly with respect to the longitudinal axis of the weight. The shank is connected to the bend of the hook at the end of which there is at least one barb.

With respect to this noted conventional configuration, which would include at the very least, weights for jig type lures and spinner type lures, a resilient sleeve is fitted over a substantial portion of the front end and body portion of said weight in expanded, tensioned manner. The front part of said sleeve is tapered forwardly in near conical manner and an intermediate portion of the said sleeve is typically of substantially cylindrical form to overlie the intermediate portion of the weight. The rear end or portion of said sleeve is slit in parallel fashion at numerous places in order to provide a multiplicity of elongate tendrils, tentacles, strands or streamers. On said weight, the intermediate portion of said sleeve, just before said streamers, typically, is folded over upon itself on said weight's intermediate or substantially cylindrical body portion. Means are provided securing the two sleeve thicknesses (in said sleeve folded over intermediate portion) to one another and said weight body portion adjacent to the streamers. The purpose and result of the latter is that the streamers, tendrils, strands or tentacles extend first forwardly, then outwardly and, finally, rearwardly around and more or less obscuring all of said hook shank, hook bend, hook barb and rear weight portion in use.

A circumferential groove may be provided on said weight body portion to receive and secure said folded over sleeve intermediate portion and means securing same. Raised means may be provided rearwardly of said groove on said weight body portion to aid retention of said sleeve folded over portion and securement in said groove. In almost all cases, said groove is preferably positioned past the intermediate portion of said weight and, in most cases, closely adjacent the rear end portion of said weight body. The raised means, typically comprising a raised circumferential flange, may be at the rear endmost portion of said weight.

When said securement is made on the folded over portion of said sleeve, it may be made essentially on the bases of said tentacles or streamers or on the unslit skin or sleeve before the bases of the tentacles. Opposed eye-like showings may be provided on the sleeve ahead of the securement for fish attracting purposes.

In a jig type bait or lure, the weight may be provided with an opening for a weed guard in the body portion thereof and a matching opening may be provided in said sleeve with the weed guard extending rearwardly at an angle over or near the hook barb at least substantially into the inboard base area or array of said streamers as they extend forwardly and outwardly.

The sleeve or skin, including the foldover and secured portion thereof, preferably at least substantially entirely covers the front to rear area and surface of the weight. Optionally, the foldover of the sleeve or skin for securement may be provided substantially rearward of the securement itself whereby the portion of the weight behind the securement is covered by the folded over skin or sleeve.

Thus it may be seen that a new and novel bait or lure has been provided with distinct new structure and substantial new advantages. The tentacles or streamers, by flaring forwardly then out and around, afford and provide more action in use in the water than previous configurations. These members breathe, dance and stream in motion of the bait in a new and more lifelike fashion.

The material of the skin, if selected as a more buoyant plastic material, further contributes to such action and movement in the water. With the sleeve fitted over the head of the weight, this portion of the bait or lure becomes softer and more natural, like an actual organic skin, thus more fish acceptable, when compared to painted lead weights and portions thereof.

Experience of fishermen has established that spinning lures with the subject invention incorporated thereon run better in the water. Compared to all previous tentacle and streamer uses, the subject tentacles and streamers interfere least of all with the hook. Entanglement of the tentacles and streamers with the hook is absolutely minimized, a fact of great importance. This freeing of the hook from the streamer action or tentacle action enables the fisherman, if he wishes, to put other materials on the hook itself for additional attractiveness to the fish without entanglement with the tentacles or streamers.

In the case of a lure weight body where a groove is not provided, a flange is not provided or neither a groove nor flange provided, in order to better secure the tied or secured base of the streamers or tentacles with respect to the weight body, the outside of the weight may be roughened to some degree. This may be accomplished, for example, by using a coarse sandblaster with respect to the mold for the weight to give a rough texture thereto. Other modes of achieving such increased frictional surface may be employed.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible emobidments may be made of the invention without departing from the scope thereof, it is to be understood that all matter herein set forth or shown in the accompanying drawings is to be interpreted as illustrative and not in a limiting sense.

I claim:

1. In a weight for a fishing lure, said weight comprising a substantially bullet (slug) shaped configuration in at least the leading portion thereof, with a substantially rounded, semi-conical front end, a substantially cylindrical body portion and a rear end portion following said body portion, there being a hook lead wire received in part in said weight and fixed with respect to same, the following shank wire of the hook extending substantially axially rearwardly with respect to the longitudinal axis of said weight, said shank connected to the bend of the hook, at the end of which there is at least one barb, the improvement which comprises:
   a resilient sleeve fitted over a substantial portion of the front end and body portion of said weight in expanded, tensioned manner,
   the front part of said sleeve tapered forwardly in near conical manner, an intermediate portion of said sleeve being of substantially cylindrical form and the rear portion of said sleeve being slit to provide a multiplicity of elongate tendrils, strands or streamers said streamers having base portions at the junctures of said slit ends with said sleeve intermediate portion,
   the intermediate portion of said sleeve just before said streamers being folded over upon itself on the said weight substantially cylindrical body portion
   and means securing the two sleeve thicknesses in said folded over intermediate portion to one another and said weight body portion closely adjacent to the bases of said streamers,
   whereby the streamers extend first forwardly, then outwardly and finally rearwardly around said hook shank, bend and barb, as well as the rear weight portion.

2. A device as in claim 1 wherein a circumferential groove is provided on said weight body portion to receive and aid in securing at least a portion of said folded over sleeve intermediate portion and the means securing same.

3. A device as in claim 2 including raised means rearwardly positioned of said groove on said weight body portion to aid retention of said sleeve folded over portion and securement in said groove.

4. A device as in claim 3 wherein said raised means comprises a raised, substantially circumferential flange.

5. A device as in claim 2 wherein said groove is positioned closely adjacent the rear end of said weight body portion.

6. A device as in claim 1 wherein raised means are provided on said weight body portion rearwardly of said sleeve folded over portion and securing means therefor to aid in said securement.

7. A device as in claim 6 wherein said raised means comprises a raised, substantially circumferential flange.

8. A device as in claim 6 wherein said raised means is positioned closely adjacent the rear end of said body portion.

9. A device as in claim 1 including said securement being positioned ahead of the per se fold in said sleeve.

10. A device as in claim 1 including a portion of said intact sleeve positioned ahead of said securement.

11. A device as in claim 1 including no portion of said intact sleeve positioned ahead of said securement.

12. A device as in claim 1 including opposed eye like showings on the sleeve ahead of said securement.

13. A device as in claim 1 wherein said weight is provided with an opening for a weed guard in the body portion thereof and a matching opening is provided in said sleeve, said weed guard extending rearwardly at an angle over said hook at least substantially into the inboard base array of said streamers as they extend forwardly and outwardly.

14. A device as in claim 1 wherein the sleeve, including the folded over and secured portion thereof, at least substantially entirely covers the front to rear surface of the weight.

15. A device as in claim 1 wherein the fold over is substantially rearwardly positioned of the securement and the latter is substantially at the bases or origins of the streamers.

16. A device as in claim 1 wherein the fold over is substantially rearwardly positioned of the securement and the latter is substantially short of the origin of the streamers.

17. A device as in claim 1 including means provided on the body portion of said weight cooperating with at least a portion of the folded over length of said sleeve and said securement to aid in fixing said sleeve, securement and streamers on and to said weight.

18. A device as in claim 1 including adhesive applied to the interior of said sleeve forward portion before application thereof to said weight.

19. In a weight for a fishing lure, said weight comprising a substantially bullet (slug) shaped configuration in at least the leading portion thereof, with a substantially rounded, semi-conical front end, a body portion following said front end and a rear end portion following said body portion, there being a hook lead wire received at least in part in said weight and fixed within and with respect to same, the following shank wire of the hook extending substantially axially rearwardly with respect to the longitudinal axis of said weight, said shank being connected to the end bend of the hook, at the upmost end of which there is at least one barb, the improvement which comprises:

a resilient sleeve closely fitted over a substantial portion of the front end and body portion of said weight, the front part of said sleeve being tapered forwardly in semi-conical manner, an intermediate portion of said sleeve being shaped to substantially fit the external portion of said weight body portion and the rear portion of said sleeve being provided with a multiplicity of elongate tendrils, strands or streamers, said tendrils having base portions at the rear end of said sleeve intermediate portion and being of substantially greater length than the length of the front and intermediate portions of said sleeve, one of the intermediate portion of said sleeve most adjacent the base portion of said tendrils and the base portions of said tendrils being folded over upon themselves on said weight body portion and means aiding in securing the two sleeve portion thicknesses in said folded over portions thereof to one another and said weight body portion closely adjacent to the bases of said tendrils, whereby the tendrils extend first forwardly, then arcuately outwardly and, finally, rearwardly around said hook shank, bend and barb, as well as the weight rear portion.

20. A device as in claim 19 wherein a circumferential groove is provided on said weight body portion to receive and aid in securing at least a portion of said folded over sleeve portions and the means aiding in securing same.

21. A device as in claim 20 including a circumferential raised ridge immediately rearwardly positioned of said groove on said weight body portion to aid retention of said sleeve folded over portion and securement thereof in said groove.

22. A device as in claim 20 including raised means rearwardly positioned of at least portions of said groove on said weight body portion operative to aid retention of said sleeve folded over portion and securement thereof in said groove.

23. A device as in claim 20 wherein said groove is positioned closely adjacent the rear end of said weight body portion.

24. A device as in claim 22 wherein raised means are provided on said weight body portion rearwardly of said sleeve folded over portion and the securing means therefor to aid in said securement.

25. A device as in claim 22 wherein said raised means comprises a radially extending, substantially circumferential flange.

26. A device as in claim 22 wherein said raised means is positioned closely adjacent the rear end of said body portion.

27. A device as in claim 19 including said securement being positioned ahead of the per se fold in said sleeve.

28. A device as in claim 27 including a portion of said intact sleeve positioned ahead of said securement.

29. A device as in claim 27 including no portion of said intact sleeve positioned ahead of said securement.

30. A device as in claim 19 including opposed eye-like showings on the external surface of the sleeve ahead of said securement.

31. A device as in claim 19 wherein said weight is provided with an opening for a weed guard in the body portion thereof and a matching opening is provided through said sleeve, said weed guard extending rearwardly at an angle over said hook at least substantially into the inboard base array of said streamers as they extend forwardly and outwardly.

32. A device as in claim 19 wherein the sleeve, including the folded over and secured portion thereof, at least substantially entirely covers the front to rear surface of the weight.

33. A device as in claim 19 wherein the fold over is substantially rearwardly positioned of the securement and the securement is positioned substantially at the bases or origins of the tendrils.

34. A device as in claim 19 wherein the fold over is substantially rearwardly positioned of the securement and the latter is positioned substantially short of the origin of the tendrils.

35. A device as in claim 19 including means provided on the body portion of said weight cooperating with at least a portion of the folded over length of said sleeve and said securement to aid in fixing said sleeve, securement and tendrils on and to said weight.

36. A device as in claim 19 including adhesive applied to the interior of said sleeve forward portion before application thereof to said weight.

37. A device as in claim 19 wherein said resilient sleeve is fitted over a substantial portion of the front end and body portion of said weight in an expanded, tensioned manner.

38. A device as in claim 19 wherein said weight includes a substantially rounded, semi-conical front end, a substantially cylindrical body portion and a rearwardly tapered rear end portion following said body portion.

39. A device as in claim 19 including means provided on the rear end portion of said weight cooperating with at least a portion of the folded over length of said sleeve and said securement to aid in fixing said sleeve, securement and tendrils on and to said weight.

* * * * *